United States Patent
Yoshino

(10) Patent No.: US 12,017,485 B2
(45) Date of Patent: Jun. 25, 2024

(54) HEAVY DUTY TIRE

(71) Applicant: Sumitomo Rubber Industries, Ltd., Kobe (JP)

(72) Inventor: Masayuki Yoshino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/209,553

(22) Filed: Jun. 14, 2023

(65) Prior Publication Data

US 2023/0415520 A1    Dec. 28, 2023

(30) Foreign Application Priority Data

Jun. 24, 2022  (JP) ................. 2022-101540

(51) Int. Cl.
*B60C 15/06* (2006.01)
*B60C 19/00* (2006.01)
*B60C 23/00* (2006.01)

(52) U.S. Cl.
CPC .......... *B60C 19/00* (2013.01); *B60C 15/0607* (2013.01); *B60C 2015/0617* (2013.01); *B60C 2019/004* (2013.01); *B60C 2200/06* (2013.01)

(58) Field of Classification Search
CPC ............ B60C 15/0607; B60C 23/0433; B60C 23/0491; B60C 15/06; B60C 215/0617; B60C 15/0603; B60C 2015/0617
See application file for complete search history.

(56) References Cited

U.S. PATENT DOCUMENTS

| 6,044,885 A | * | 4/2000 | Kato ................... B60C 15/0607 152/543 |
| 2011/0175778 A1 | | 7/2011 | Myatt |
| 2022/0297482 A1 | | 9/2022 | Suita |

FOREIGN PATENT DOCUMENTS

| CN | 101389496 | * | 3/2012 |
| EP | 3 677 452 A1 | | 7/2020 |
| JP | 2020-55521 A | | 4/2020 |
| JP | 2021-46057 A | | 3/2021 |
| KR | 10-2010-0120505 A | | 11/2010 |
| WO | WO 03/105509 | * | 12/2003 |
| WO | WO 2016/060851 | * | 4/2016 |
| WO | WO 2021/039603 A1 | | 3/2021 |

OTHER PUBLICATIONS

Extended European Search Report dated Nov. 7, 2023 for Application No. 23180656.3.

* cited by examiner

*Primary Examiner* — Justin R Fischer
(74) *Attorney, Agent, or Firm* — Birch, Stewart, Kolasch & Birch, LLP

(57) ABSTRACT

A tire 2 includes a pair of heads 10, a carcass 12, a pair of sidewalls 6, a pair of chafers 8, and a tag member 26 including an RFID tag 56. Each of the beads 10 includes an inner apex 40 and an outer apex 42. A carcass ply 48 included in the carcass 12 includes a ply body 50 and a pair of turned-up portions 52. The tag member 26 is in contact with the outer apex 42 on a radially outer side of an end PF of the turned-up portion 52, the RFID tag 56 is located between an outer end PG2 of the outer apex 42 and an outer end PB of the chafer 8, and an outer end 26s of the tag member 26 is located radially outward of the outer end PB of the chafer 8.

18 Claims, 4 Drawing Sheets

HEAVY DUTY TIRE

CROSS REFERENCE TO RELATED APPLICATION

This application claims priority on Japanese Patent Application No. 2022-101540 filed on Jun. 24, 2022, the entire content of which is incorporated herein by reference.

TECHNICAL FIELD

The present invention relates to heavy duty tires.

BACKGROUND ART

In order to manage data regarding manufacturing management, customer information, running history, etc., of tires, incorporation of radio frequency identification (RFID) tags into tires has been proposed. Various studies have been conducted for the technology to incorporate an RFID tag into a tire (for example, PATENT LITERATURE 1 below).

CITATION LIST

Patent Literature

PATENT LITERATURE 1: Japanese Laid-Open Patent Publication No. 2021-046057

SUMMARY OF THE INVENTION

Technical Problem

From the viewpoint of preventing damage, an RFID tag is provided in a portion of a tire where the degree of bending is small. In the case of a heavy duty tire, each bead portion has high stiffness. In the heavy duty tire, the bead portion is effective as a location for placing the RFID tag.

A tire includes a carcass extending on and between a pair of beads. The carcass includes a carcass ply. The carcass ply is turned up around the beads. In the case of a heavy duty tire, each turned-up portion of the carcass ply is placed such that an end thereof overlaps an apex of the bead.

The carcass ply includes a large number of carcass cords aligned with each other. In a heavy duty tire, steel cords are used as the carcass cords. If the RFID tag is placed near metal components such as steel cords, there is a concern that radio waves may be disturbed.

In the heavy duty tire, if the RFID tag is set in the bead portion, from the viewpoint of ensuring a distance from metal components, it has been considered to place the RFID tag in a zone between the end of the turned-up portion and the end of the apex.

Meanwhile, an outer end of a chafer is located axially outward of the bead. The chafer extends radially outward from the rim side. The outer end of the chafer is a location where waving called creases is likely to occur in the manufacture of the tire. The creases may cause a reduction in durability and appearance quality of the tire.

The present invention has been made in view of such circumstances. An object of the present invention is to provide a heavy duty tire that can achieve formation of a good communication environment and reduction of the risk of damage to an RFD tag while suppressing occurrence of creases.

Solution to Problem

A heavy duty tire according to the present invention includes: a pair of beads; a carcass extending on and between the pair of beads; a pair of sidewalls each located axially outward of the carcass; a pair of chafers each located radially inward of the sidewall and configured to come into contact with a rim; and a tag member including an RFID tag. Each of the beads includes a core, an inner apex located radially outward of the core, and an outer apex located radially outward of the inner apex. The carcass includes a carcass ply, and the carcass ply includes a ply body extending between the pair of beads and a pair of turned-up portions each connected to the ply body and turned up around the bead. The tan member is in contact with the outer apex on a radially outer side of an end of the turned-up portion, the RFID tag is located between an outer end of the outer apex and an outer end of the chafer in a radial direction, and an outer end of the tag member is located radially outward of the outer end of the chafer.

Advantageous Effects of the Invention

According to the present invention, a heavy duty tire that can achieve formation of a good communication environment and reduction of the risk of damage to an RFID tag while suppressing occurrence of creases, is obtained.

DETAILED DESCRIPTION

Figure 1:
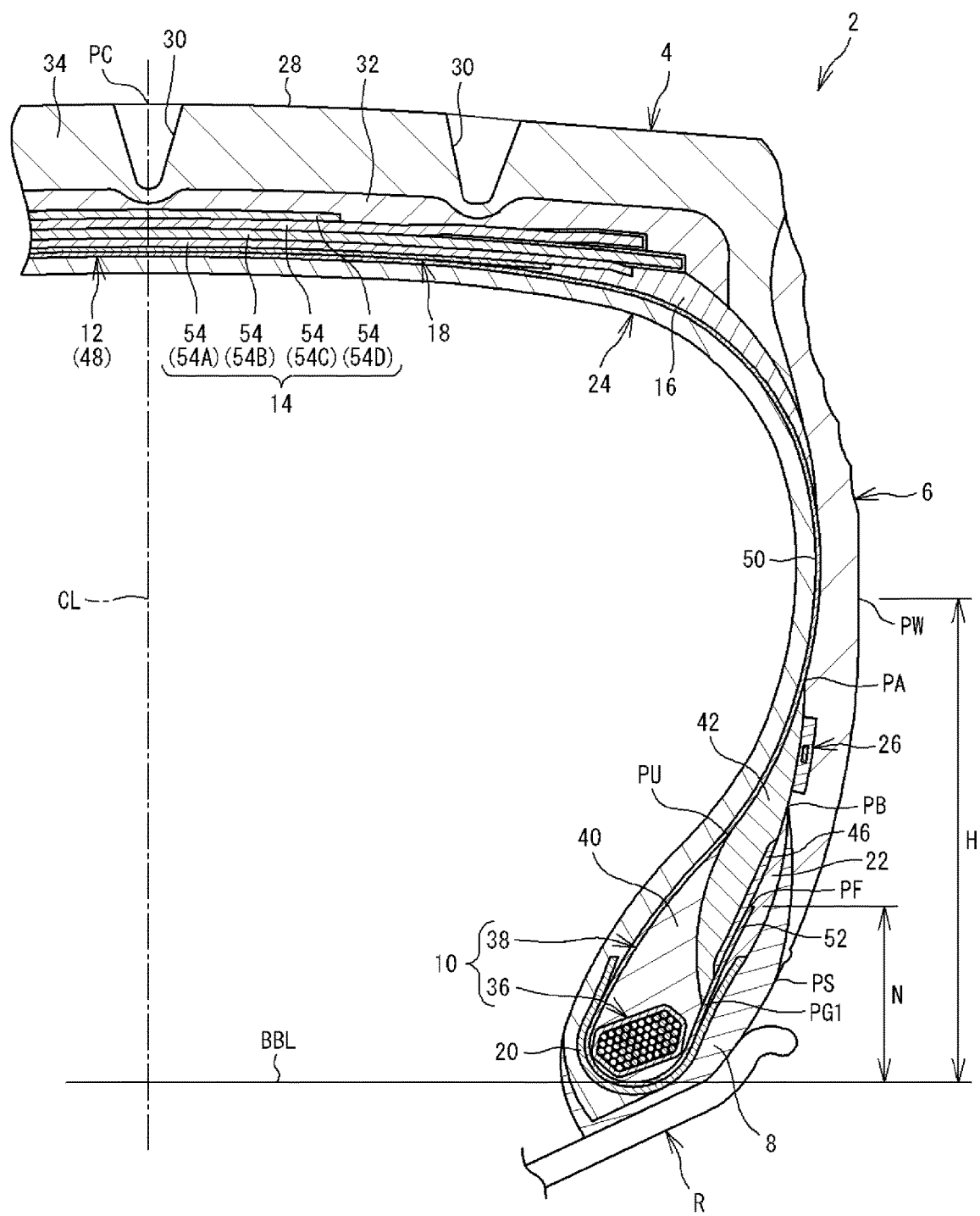
FIG. 1 is a cross-sectional view showing a part of a heavy duty tire.

The following will describe in detail the present invention based on preferred embodiments with appropriate reference to the drawings.

A tire of the present disclosure is fitted on a rim. The interior of the tire is filled with air to adjust the internal pressure of the tire. The tire fitted on the rim is also referred to as tire-rim assembly. The tire-rim assembly includes the rim and the tire fitted on the rim.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cut surface of the tire obtained by cutting the tire along a plane including the rotation axis of the tire. In this measurement, the tire is set such that the distance between right and left beads is made equal to the distance between the beads in the tire that is fitted on the normal rim. A component, of the tire, which cannot be confirmed in a state where the tire is fitted on the normal rim is confirmed in the above-described cut surface.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a tread portion of the tire is a portion of the tire that comes into contact with a road surface. A bead portion is a portion of the tire that is fitted to a rim. A sidewall portion is a portion of the tire that extends between the tread portion and the bead portion. The tire includes a tread portion, a pair of bead portions, and a pair of sidewall portions as portions thereof.

In the present disclosure, a complex elastic modulus of a component formed from a crosslinked rubber, from among the components included in the tire, is measured according to the standards of JIS K6394. The measurement conditions are as follows.
Initial strain=10%
Dynamic strain=±1%
Frequency=10 Hz
Mode=stretch mode
Temperature=70° C.

In this measurement, a test piece (a length of 40 mm×a width of 4 mm×a thickness of 1 mm) is sampled from the tire. The length direction of the test piece is caused to coincide with the circumferential direction of the tire. When a test piece cannot be sampled from the tire, a test piece is sampled from a sheet-shaped crosslinked rubber (hereinafter, also referred to as a rubber sheet) obtained by pressurizing and heating a rubber composition, which is used for forming the component to be measured, at a temperature of 170° C. for 12 minutes.

In the present disclosure, the complex elastic modulus is represented as a complex elastic modulus at 70° C.

Outline of Embodiments of the Present Disclosure

Configuration 1

A heavy duty tire according to an aspect of the present disclosure includes: a pair of beads; a carcass extending on and between the pair of beads; a pair of sidewalls each located axially outward of the carcass; a pair of chafers each located radially inward of the sidewall and configured to come into contact with a rim; and a tag member including an RFID tag, wherein each of the beads includes a core, an inner apex located radially outward of the core, and an outer apex located radially outward of the inner apex, the carcass includes a carcass ply, the carcass ply includes a ply body extending between the pair of beads and a pair of turned-up portions each connected to the ply body and turned up around the bead, the tag member is in contact with the outer apex on a radially outer side of an end of the turned-up portion, the MD tag is located between an outer end of the outer apex and an outer end of the chafer in a radial direction, and an outer end of the tag member is located radially outward of the outer end of the chafer.

By forming the tire as described above, the tag member is placed in the bead portion where the degree of bending is small. In the tire, the risk of damage to the RFID tag is low in the tire, the outer apex is located between the carcass ply and the RFID tag. Since the RFID tag is placed so as to be spaced apart from the carcass ply, even if the carcass ply includes steel cords as carcass cords, radio waves are less likely to be disturbed. In the tire, a good communication environment is formed between the RFID tag and a communication device (not shown). Writing of data to the RFID tag and reading of data recorded in the RFID tag are accurately performed.

In the tire, the outer end of the tag member is located radially outward of the outer end of the chafer. Accordingly, interference between the outer end of the chafer and the tag member is suppressed as compared to the case where the outer end of the tag member is located radially inward of the outer end of the chafer. In the tire, occurrence of creases is suppressed.

The tire can achieve formation of a good communication environment and reduction of the risk of damage to the RFID tag while suppressing occurrence of creases.

Configuration 2

Preferably, in the tire described in [Configuration 1] above, an inner end of the tag member is located radially outward of the outer end of the chafer.

By forming the tire as described above, interference between the tag member and the outer end of the chafer is effectively suppressed. In the tire, occurrence of creases is effectively suppressed.

Configuration 3

Preferably, in the tire described in [Configuration 1] or [Configuration 2] above, the outer end of the chafer is located radially outward of an inner end of the sidewall, and the sidewall covers the outer end of the chafer.

By forming the tire as described above, strain applied to the outer end of the chafer is effectively alleviated. In the tire, occurrence of damage starting from the outer end of the chafer is effectively suppressed.

Configuration 4

Preferably, in the tire described in any one of [Configuration 1] to [Configuration 3] above, a ratio of a radial height of the outer end of the chafer to a radial height of the inner end of the sidewall is not less than 2.00 and not greater than 3.25.

By forming the tire as described above, a region where the sidewall and the chafer are joined together can be sufficiently ensured. A space for placing the tag member is ensured, so that the tire allows the tag member to be placed at a position at which interference with the outer end of the chafer is less likely to occur. In the tire, occurrence of creases is effectively suppressed.

Configuration 5

Preferably, in the tire described in any one of [Configuration 1] to [Configuration 4] above, a ratio of a radial height of the outer end of the outer apex to the radial height of the outer end of the chafer is not less than 1.08 and not greater than 1.54.

By forming the tire as described above, the tire allows the tag member to be placed at a position at which interference with the outer end of the chafer is less likely to occur. In the tire, occurrence of creases is suppressed. The influence of the outer apex on bending of the tire is suppressed, so that good ride comfort is maintained with the tire.

Configuration 6

Preferably, in the tire described in any one of [Configuration 1] to [Configuration 5] above, the tag member is provided on a side of a first sidewall out of the pair of sidewalls. By forming the tire as described above, the risk of occurrence of creases is reduced.

Configuration 7

Preferably, in the tire described in any one of [Configuration 1] to [Configuration 6] above, the tag member is a plate-shaped member in which the RFID tag is covered with a crosslinked rubber, and the tag member has a thickness of not less than 1.0 mm and not greater than 2.5 mm.

By forming the tire as described above, the risk of damage to the RFID tag is reduced, and a good communication environment is formed.

Configuration 8

Preferably, in the tire described in any one of [Configuration 1] to [Configuration 7] above, an outer end of the inner apex is located between the end of the turned-up portion and the RFID tag in the radial direction.

By forming the tire as described above, the inner apex effectively increases the stiffness of the bead portion. Strain applied to the RFID tag is effectively reduced. The tire can effectively reduce the risk of damage to the RFID tag.

Details of Embodiments of the Present Disclosure

FIG. 1 shows a part of a heavy duty tire 2 (hereinafter, also referred to simply as "tire 2") according to an embodiment of the present disclosure. The tire 2 is mounted to a vehicle such as a truck and a bus.

In FIG. 1, the tire 2 is fitted on a rim R (normal rim).

FIG. 1 shows a part of a cross-section (hereinafter, meridian cross-section) of the tire 2 along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2.

Figure 2:
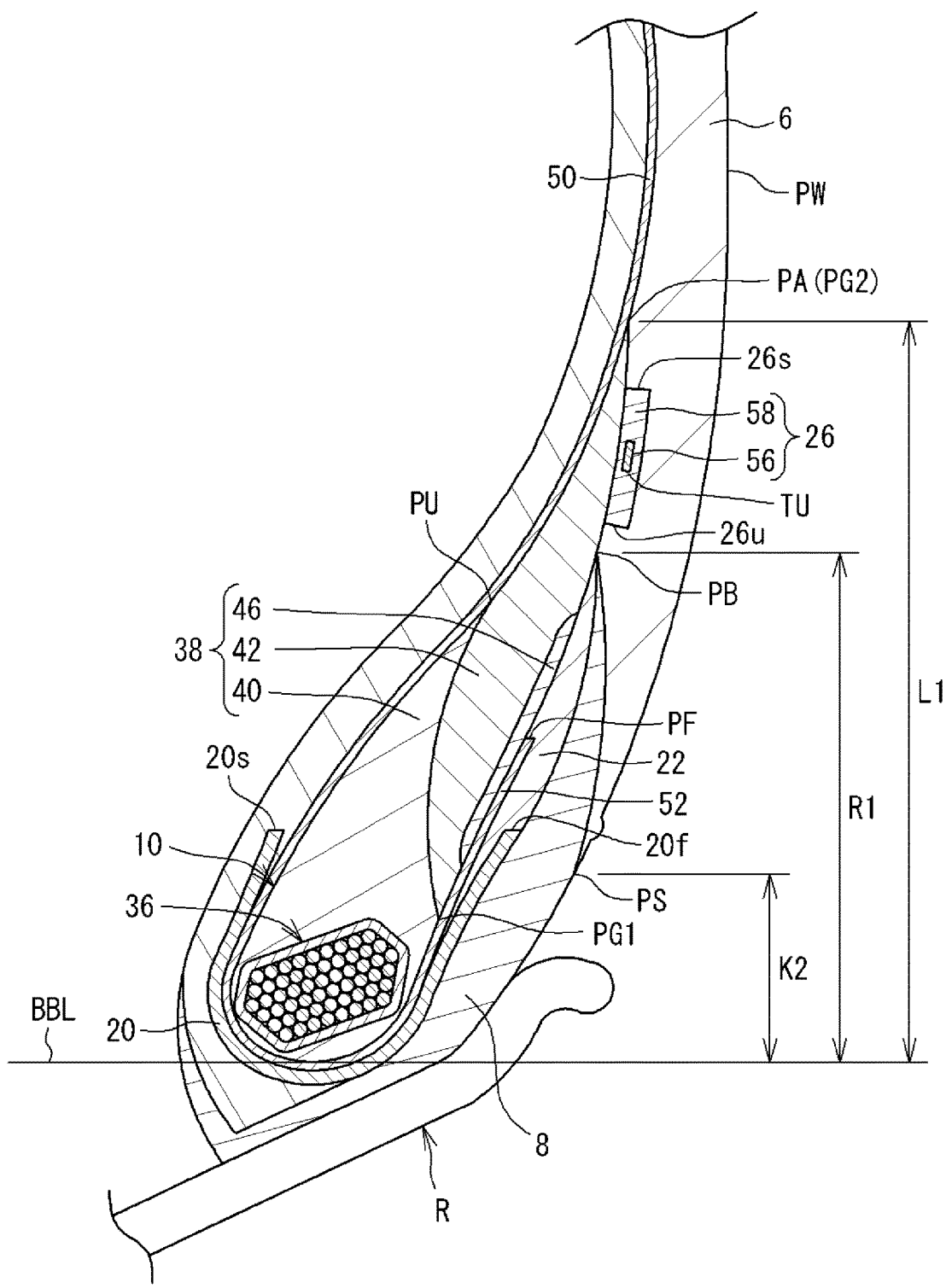
FIG. 2 is a cross-sectional view showing a part of the tire in FIG. 1.

FIG. 2 shows a part of the cross-section shown in FIG. 1. FIG. 2 shows a bead portion of the tire 2.

In FIG. 1, an alternate long and short dash line CL extending in the radial direction represents the equator plane of the tire 2. In FIG. 1 and FIG. 2, a solid line BBL extending in the axial direction is a bead base line. The bead base line BBL is a line that defines the rim diameter (see JATMA or the like) of the rim R.

The tire 2 includes a tread 4, a pair of sidewalls 6, a pair of chafers 8, a pair of beads 10, a carcass 12, a belt 14, a pair of cushion layers 16, a strip layer 18, a pair of steel reinforcing layers 20, a pair of interlayer strips 22, an inner liner 24, and a tag member 26.

The tread 4 is located radially outward of the carcass 12. The tread 4 comes into contact with a road surface at a tread surface 28 thereof. Grooves 30 are formed on the tread 4.

The tread 4 includes a base portion 32 and a cap portion 34 located radially outward of the base portion 32. The base portion 32 is formed from a crosslinked rubber that has low heat generation properties. The cap portion 34 is formed from a crosslinked rubber for which wear resistance and grip performance are taken into consideration. The cap portion 34 includes the tread surface 28.

In FIG. 1, a position indicated by reference sign PC corresponds to an equator. The equator PC is the point of intersection of the tread surface 28 and the equator plane CL. In the case where the groove 30 is located on the equator plane CL as in the tire 2, the equator PC is specified on the basis of a virtual tread surface obtained on the assumption that the groove 30 is not present thereon.

The distance in the radial direction, from the bead base line BBL to the equator PC, obtained in the tire 2 in the normal state is the cross-sectional height (see JATMA or the like) of the tire 2.

Each sidewall 6 is connected to an end of the tread 4. The sidewall 6 is located radially inward of the tread 4. The sidewall 6 is located axially outward of the carcass 12. A position indicated by reference sign PS is an inner end of the sidewall 6.

The sidewall 6 is formed from a crosslinked rubber for which cut resistance is taken into consideration. The complex elastic modulus of the sidewall 6 is not less than 2.0 MPa and not greater than 6.0 MPa.

A position indicated by reference sign PW is an axially outer end (hereinafter, outer end PW) of the tire 2. In the case where decorations such as patterns and letters are present on the outer surface of the tire 2, the outer end PW is specified on the basis of a virtual outer surface obtained on the assumption that the decorations are not present thereon. The tire 2 has a maximum width at the outer end PW. The outer end PW is also referred to as maximum width position.

The distance in the axial direction, from a first outer end PW to a second outer end PW (not shown), obtained in the tire 2 of the normal state is the cross-sectional width (see JATMA or the like) of the tire 2.

In FIG. 1, a length indicated by reference sign H is the distance in the radial direction from the bead base line BBL to the maximum width position PW. The distance H in the radial direction is also referred to as radial height of the maximum width position PW.

In the tire 2 in the normal state, the ratio of the radial height H of the maximum width position PW to the cross-sectional height is not less than 0.40 and not greater than 0.60.

Each chafer 8 is located radially inward of the sidewall 6. The chafer 8 comes into contact with the rim R. A position indicated by reference sign PB is an outer end of the chafer 8.

The chafer 8 is formed from a crosslinked rubber for which wear resistance is taken into consideration. The complex elastic modulus of the chafer 8 is not less than 10 MPa and not greater than 15 MPa. The chafer 8 is harder than the sidewall 6.

Each bead 10 is located axially inward of the chafer 8. The bead 10 is located radially inward of the sidewall 6. The bead 10 includes a core 36 and an apex 38.

The core 36 extends in the circumferential direction. The core 36 includes a wound wire made of steel. The core 36 has a substantially hexagonal cross-sectional shape.

The apex 38 is located radially outward of the core 36. The apex 38 extends radially outward from the core 36. The apex 38 is tapered outward. An outer end PA of the apex 38 is located radially inward of the maximum width position PW. The outer end PA of the apex 38 is located radially outward of the outer end PB of the chafer 8.

The apex 38 includes an inner apex 40 and an outer apex 42. The inner apex 40 is located radially outward of the core 36. The outer apex 42 is located radially outward of the inner apex 40.

The inner apex 40 is tapered outward. The inner apex 40 is formed from a hard crosslinked rubber. The complex elastic modulus of the inner apex 40 is not less than 60 MPa and not greater than 90 MPa.

The outer apex 42 is thick around an outer end PU of the inner apex 40. The outer apex 42 is tapered inward and tapered outward from the thick portion thereof.

An inner end PG1 of the outer apex 42 is located near the core 36.

In FIG. 2, a length indicated by reference sign L1 is the distance in the radial direction from the bead base line BBL to the outer end PG2 of the outer apex 42. The distance L1 in the radial direction is also referred to as radial height of the outer end PG2 of the outer apex 42. The outer end PG2 of the outer apex 42 is also the outer end PA of the apex 38. The distance L1 in the radial direction is also referred to as radial height of the bead 10.

In the tire 2, from the viewpoint of swell balancing the stiffness of the bead portion and bending of the tire 2, the ratio (L1/H) of the radial height L1 of the bead 10 to the radial height H of the maximum width position PW is adjusted in the range of not less than 0.55 and not greater than 0.95.

The outer apex 42 is formed from a crosslinked rubber. The outer apex 42 is more flexible than the inner apex 40. The complex elastic modulus of the outer apex 42 is not less than 3.0 MPa and not greater than 6.0 MPa.

The outer apex 42 has stiffness substantially equal to the stiffness of the sidewall 6, or is harder than the sidewall 6.

The outer apex 42 is more flexible than the chafer 8.

The apex 38 of the tire 2 further includes an edge strip 46.

The edge strip 46 is located axially outward of the outer apex 42 and forms a part of the outer surface of the apex 38. The edge strip 46 is located between the outer end PB of the chafer 8 and the inner end PG1 of the outer apex 42.

The edge strip 46 is formed from a crosslinked rubber. The edge strip 46 is more flexible than the chafer 8 and is harder than the outer apex 42. The complex elastic modulus of the edge strip 46 is not less than 7.0 MPa and not greater than 12 MPa.

The carcass 12 is located inward of the tread 4, the pair of sidewalls 6, and the pair of chafers 8. The carcass 12 extends on and between the pair of beads 10. The carcass 12 of the tire 2 has a radial structure.

The carcass 12 includes at least one carcass ply 48. The carcass 12 of the tire 2 is composed of one carcass ply 48. The carcass ply 48 is turned up around the beads 10.

The carcass ply 48 has a ply body 50 and a pair of turned-up portions 52. The ply body 50 extends between the pair of beads 10, that is, between a first bead 10 and a second bead 10. Each turned-up portion 52 is connected to the ply body 50 and turned up around the bead 10. The turned-up portion 52 of the tire 2 is turned up around the bead 10 from the inner side toward the outer side in the axial direction. An end PF of the turned-up portion 52 is located radially inward of the outer end PB of the chafer 8. The bead 10 is interposed between the ply body 50 and the turned-up portion 52.

The carcass ply 48 includes a large number of carcass cords aligned with each other, which are not shown. These carcass cords are covered with a topping rubber. Each carcass cord intersects the equator plane CL. Steel cords are used as the carcass cords of the tire 2.

In FIG. 1, a length indicated by reference sign N is the distance in the radial direction from the bead base line BBL to the end PF of the turned-up portion 52. The distance N in the radial direction is also referred to as radial height of the end PF of the turned-up portion 52.

In the tire 2, the ratio (N/H) of the radial height N of the end PF of the turned-up portion 52 to the radial height H of the maximum width position PW is not less than 0.25 and not greater than 0.45.

The belt 14 includes four belt plies 54. The four belt plies 54 are a first belt ply 54A, a second belt ply 54B, a third belt ply 54C, and a fourth belt ply 54D. These belt plies 54 are aligned in the radial direction.

In the tire 2, the second belt ply 54B has a largest width, and the fourth belt ply 54D has a smallest width.

Each belt ply 54 includes a large number of belt cords aligned with each other, which are not shown. Each belt cord is tilted relative to the equator plane CL. Steel cords are used as the belt cords of the tire 2.

Each cushion layer 16 is located between the belt 14 and the carcass 12 at the end of the belt 14. The cushion layer 16 is formed from a flexible crosslinked rubber.

The strip layer 18 is located between the carcass 12 and the belt 14 on the radially inner side of the tread 4. In the axial direction, the strip layer 18 is located between a first cushion layer 16 and a second cushion layer 16. The strip layer 18 is formed from a crosslinked rubber.

Each steel reinforcing layer 20 is located in the bead portion. The steel reinforcing layer 20 is located between the chafer 8 and the carcass 12. The steel reinforcing layer 20 is turned up around the bead 10. The steel reinforcing layer 20 includes a large number of filler cords aligned with each other, which are not shown. The material of the filler cords is steel.

A first end 20f of the steel reinforcing layer 20 is located between the chafer 8 and the turned-up portion 52 in the axial direction. The first end 20f is located radially inward of the end PF of the turned-up portion 52. A second end 20s of the steel reinforcing layer 20 is located between the inner liner 24 and the ply body 50 in the axial direction. It is sufficient that the position in the radial direction of the second end 20s substantially coincides with that of the first end 20f, and the second end 20s may be located radially outward of the first end 20f or may be located radially inward of the first end 20f.

Each interlayer strip 22 is located between the chafer 8 and the apex 38 of the bead 10 in the axial direction. The interlayer strip 22 covers the end PF of the turned-up portion 52 and the first end 20f of the steel reinforcing layer 20.

The interlayer strip 22 is in contact with the apex 38 on the radially outer side of the end PF of the turned-up portion 52. In other words, the contact surface between the interlayer strip 22 and the apex 38 forms a part of the outer surface of the apex 38.

The interlayer strip 22 is in contact with the chafer 8 on the radially outer side of the first end 20f of the steel reinforcing layer 20. In other words, the contact surface between the interlayer strip 22 and the chafer 8 forms a part of the inner surface of the chafer 8.

The interlayer strip 22 is formed from a crosslinked rubber. The interlayer strip 22 is harder than the sidewall 6 and is more flexible than the chafer 8. The complex elastic modulus of the interlayer strip 22 is not less than 7.0 MPa and not greater than 12 MPa.

The inner liner 24 is located inward of the carcass 12. The inner liner 24 is joined to the inner surface of the carcass 12 via an insulation (not shown) formed from a crosslinked rubber. The inner liner 24 forms an inner surface of the tire 2. The inner liner 24 is formed from a crosslinked rubber that has an excellent air blocking property.

The tag member 26 is located axially outward of the bead 10. In the tire 2, the tag member 26 is provided only on the side of a first sidewall 6. The tag member 26 may be provided on each of the side of the first sidewall 6 and the side of a second sidewall 6. From the viewpoint of reducing occurrence of creases, the tag member 26 is preferably provided on the side of the first sidewall 6 out of the pair of sidewalls 6.

Figure 3:
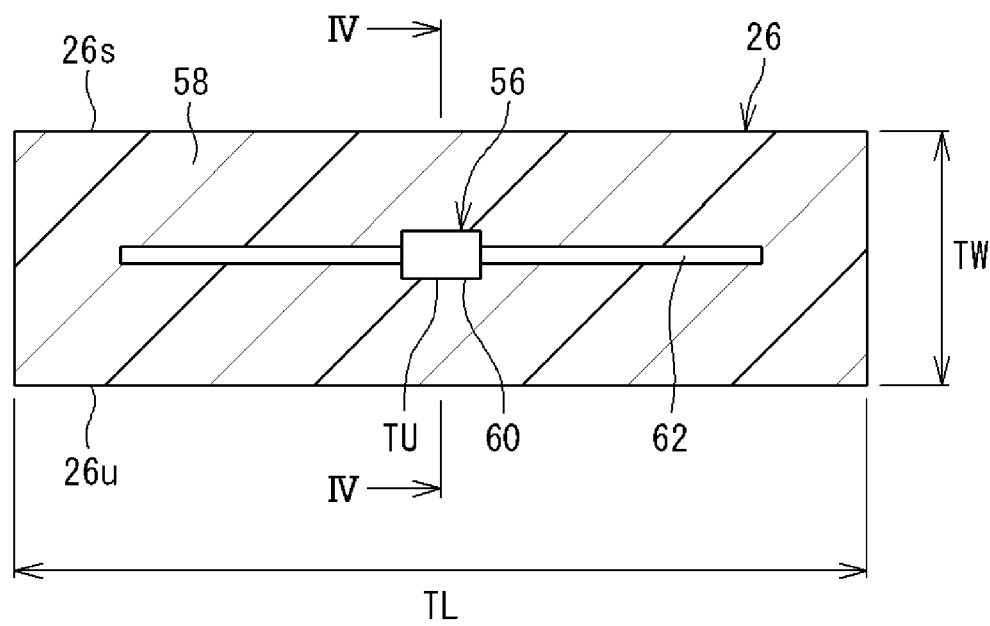
FIG. 3 is a plan view of a tag member.
Figure 4:
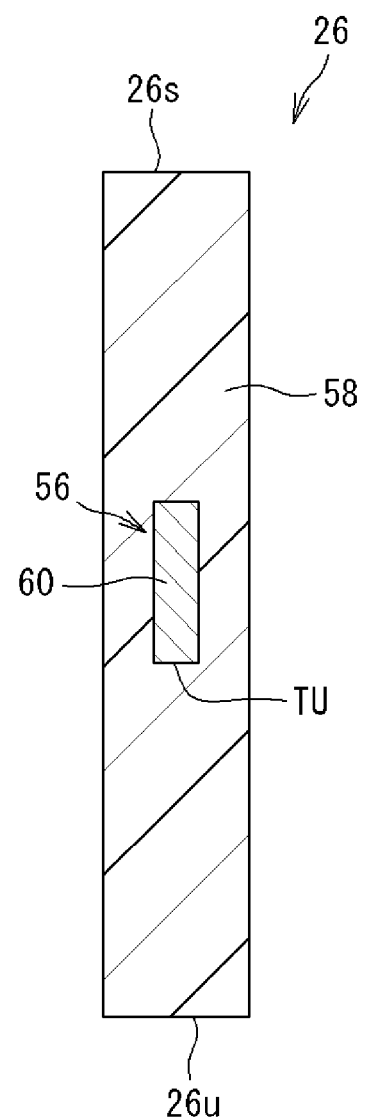
FIG. 4 is a cross-sectional view taken along a line IV-IV in FIG. 3.

FIG. 3 is a plan view of the tag member 26. FIG. 4 is a cross-sectional view taken along a line IV-IV in FIG. 3.

The tag member 26 has a plate shape. The tag member 26 is long in a length direction thereof and short in a width direction thereof. As shown in FIG. 2, in the tire 2, the tag member 26 is placed such that a first end 26s in the width direction thereof is located on the radially outer side in the tire 2 and a second end 26u in the width direction thereof is located on the radially inner side in the tire 2.

The tag member 26 includes an RFID tag 56. In FIG. 3, for convenience of description, the RFID tag 56 is shown by a solid line, but the entirely thereof is covered with a protector 58. The tag member 26 includes the RFID tag 56 and the protector 58. The RFID tag 56 is located at the center of the tag member 26. The protector 58 is formed from a crosslinked rubber. The protector 58 has stiffness substantially equal to the stiffness of the outer apex 42. In the tire 2, formation of a good communication environment is considered, and a crosslinked rubber having high electrical resistance is used for the protector 58. The protector 58 is formed from a rubber that has high insulation properties.

Although not described in detail, the RFID tag 56 is a small and lightweight electronic component that includes: a semiconductor chip 60 obtained by making a transmitter/receiver circuit, a control circuit, a memory, etc., into a chip; and an antenna 62. Upon receiving interrogation radio waves, the RFID tag 56 uses the radio waves as electrical energy and transmits various data in the memory as response radio waves. The RFID tag 56 is a type of passive radio frequency identification transponder.

In the tire 2, the tag member 26 is a plate-shaped member in which the RFID tag 56 is covered with a crosslinked rubber. From the viewpoint of reducing the risk of damage to the RFID tag 56 and forming a good communication environment, the thickness of the tag member 26 in the tire 2 is preferably not less than 1.0 mm and not greater than 2.5 mm. The thickness of the tag member 26 in the tire 2 is represented as the maximum thickness of the tag member 26 at the semiconductor chip 60 of the RFID tag 56.

A length TL of the tag member 26 before embedding in the tire 2 is not less than 60 mm and not greater than 80 mm. A width TW thereof is not less than 10 mm and not greater than 20 mm.

The position of the RFID tag 56 in the tire 2 is represented as the position of a radially inner end of the RFID tag 56 (specifically, the semiconductor chip 60) in the meridian cross-section of the tire 2. In FIG. 2, a position indicated by reference sign TU is the radially inner end of the RFID tag 56 as the position of the RFID tag 56 in the tire 2.

In the tire 2, the tag member 26 is located axially outward of the outer apex 42 on the radially outer side of the end PF of the turned-up portion 52. The tag member 26 is in contact with the outer apex 42. The boundary between the tag member 26 and the outer apex 42 forms a part of the outer surface of the outer apex 42. In other words, the boundary between the tag member 26 and the outer apex 42 forms a part of the outer surface of the apex 38.

In the tire 2, the RFID tag 56 is located between the outer end PG2 of the outer apex 42 and the outer end PB of the chafer 8 in the radial direction.

The RFID tag 56 of the tire 2 is placed in the bead portion where the degree of bending is small. In the tire 2, the risk of damage to the RFID tag 56 is low.

In the tire 2, the outer apex 42 is located between the carcass ply 48 and the RFID tag 56. The RFID tag 56 is placed so as to be spaced apart from the carcass ply 48 including the carcass cords which are metal components. Radio waves are less likely to be disturbed, so that a good communication environment is formed between the RFID tag 56 and a communication device (not shown). Writing of data to the RFID tag 56 and reading of data recorded in the RFID tag 56 are accurately performed.

Meanwhile, the outer end PB of the chafer 8 is located axially outward of the bead 10. The chafer 8 is a component extending radially outward from the rim R side. The outer end PB of the chafer 8 is a location where waving called creases is likely to occur in the manufacture of the tire 2. Since the tag member 26 is placed near the outer end PB of the chafer 8, there is a concern that creases may occur depending on the degree of interference between the outer end PB of the chafer 8 and the tag member 26.

In the tire 2, the outer end 26s of the tag member 26 is located radially outward of the outer end PB of the chafer 8. In the tire 2, interference between the outer end PB of the chafer 8 and the tag member 26 is suppressed as compared to the case where the outer end 26s of the tag member 26 is located radially inward of the outer end PB of the chafer 8 (i.e., the case where the entirety of the tag member 26 is covered with the chafer 8). In the tire 2, creases which influence durability and appearance quality are less likely to occur.

The tire 2 can achieve formation of a good communication environment and reduction of the risk of damage to the RFID tag 56 while suppressing occurrence of creases.

In the tire 2, the inner end 26u of the tag member 26 is located radially outward of the outer end PB of the chafer 8. Accordingly, the entirety of the tag member 26 is placed radially outward of the outer end PB of the chafer 8. Interference between the tag member 26 and the outer end PB of the chafer 8 is effectively suppressed. In the tire 2, occurrence of creases is effectively suppressed. From this viewpoint, in the tire 2, the inner end 26u of the tag member 26 is preferably located radially outward of the outer end PB of the chafer 8.

In the tire 2, the outer end 26s of the tag member 26 is located radially inward of the outer end PG2 of the outer apex 42. Accordingly, the influence of the tag member 26 on bending of the sidewall portion is effectively suppressed. With the tire 2, good durability and ride comfort are maintained. From this viewpoint, the outer end 26s of the tag member 26 is preferably located radially inward of the outer end PG2 of the outer apex 42.

In the tire 2, more preferably, the inner end 26u of the tag member 26 is located radially outward of the outer end PB of the chafer 8, and the outer end 26s of the tag member 26 is located radially inward of the outer end PG2 of the outer apex 42. In this case, as shown in FIG. 2, the entirety of the tag member 26 is placed between the outer end PG2 of the outer apex 42 and the outer end PB of the chafer 8.

In the tire 2, the outer end PB of the chafer 8 is located radially outward of the inner end PS of the sidewall 6, and the sidewall 6 covers the outer end PB of the chafer 8. Since the outer end PB of the chafer 8 is covered with the sidewall 6, strain applied to the outer end PB is effectively alleviated. In the tire 2, the chafer 8 is harder than the sidewall 6. Therefore, by covering the outer end PB of the chafer 8 with the sidewall 6, strain applied to the outer end PB is more effectively alleviated. In the tire 2, occurrence of damage starting from the outer end PB of the chafer 8 is effectively suppressed. From this viewpoint, in the tire 2, preferably, the outer end PB of the chafer 8 is located radially outs and of the inner end PS of the sidewall 6, and the sidewall 6 covers the outer end PB of the chafer 8.

In FIG. 2, a length indicated by reference sign R1 is the distance in the radial direction from the bead base line BBL to the outer end PB of the chafer 8. The distance R1 in the radial direction is also referred to as radial height of the outer end PB of the chafer 8.

In FIG. 2, a length indicated by reference sign K2 is the distance in the radial direction from the bead base line BBL to the inner end PS of the sidewall 6. The distance K2 in the radial direction is also referred to as radial height of the inner end PS of the sidewall 6.

In the tire 2, the ratio (R1/K2) of the radial height R1 of the outer end PB of the chafer 8 to the radial height K2 of the inner end PS of the sidewall 6 is not less than 2.00 and not greater than 3.25.

When the ratio (R1/K2) is set to be not less than 2.00, a region where the sidewall 6 and the chafer 8 are joined together can be sufficiently ensured. In the tire 2, occurrence of creases is effectively suppressed. From this viewpoint, the ratio (R1/K2) is more preferably not less than 2.20.

When the ratio (R1/K2) is set to be not greater than 3.25, a space for placing the tag member 26 is ensured. The tire 2 allows the tag member 26 to be placed at a position at which interference with the outer end PB of the chafer 8 is less likely to occur. In the tire 2, occurrence of creases is suppressed. From this viewpoint, the ratio (R1/K2) is more preferably not greater than 3.00.

In the tire 2, the ratio (L1/R1) of the radial height L1 of the outer end PG2 of the outer apex 42 to the radial height R1 of the outer end PB of the chafer 8 is preferably not less than 1.08 and not greater than 1.54.

When the ratio (L1/R1) is set to be not less than 1.08, a space for placing the tag member 26 is ensured. The tire 2 allows the tag member 26 to be placed at a position at which interference with the outer end PB of the chafer 8 is less likely to occur. In the tire 2, occurrence of creases is suppressed. From this viewpoint, the ratio (L1/R1) is more preferably not less than 1.12.

When the ratio (L1/R1) is set to be not greater than 1.54, the influence of the outer apex 42 on bending of the tire 2 is suppressed. With the tire 2, good ride comfort is maintained. From this viewpoint, the ratio (L1/R1) is more preferably not greater than 1.42.

In the tire 2, the outer end PU of the inner apex 40 is located between the end PF of the turned-up portion 52 and the RFID tag 56 in the radial direction. Accordingly, the hard inner apex 40 effectively increases the stiffness of the bead portion. Strain applied to the RFID tag 56 is effectively reduced. The tire 2 can effectively reduce the risk of damage to the RFID tag 56. From this viewpoint, the outer end PU of the inner apex 40 is preferably located between the end PF of the turned-up portion 52 and the RFID tag 56 in the radial direction. In this case, from the viewpoint of being able to further reduce the risk of damage to the RFID tag 56, more preferably, the outer end PU of the inner apex 40 is located between the end PF of the turned-up portion 52 and the RFID tag 56 in the radial direction, and further, the outer end PU of the inner apex 40 is located between the end PF of the turned-up portion 52 and the outer end PB of the chafer 8 in the radial direction.

As is obvious from the above description, according to the present invention, the heavy duty tire 2 that can achieve formation of a good communication environment and reduction of the risk of damage to the RFID tag 56 while suppressing occurrence of creases, is obtained.

EXAMPLES

The following will describe the present invention in further detail by means of examples, etc., but the present invention is not limited to these examples.

Examples 1 and 2 and Comparative Example 1

Heavy duty tires (tire size=275/70R22.5) having the basic structure shown in FIG. 1 and having specifications shown in Table 1 below were obtained.

The radial height L1 of the outer end of the outer apex was set to 80 mm. The radial height R1 of the outer end of the chafer was set to 60 mm. The radial height K2 of the inner end of the sidewall was set to 25 mm.

The tag member was set so as to be in contact with the outer surface of the apex. In particular, the tag member was set in a zone, between the outer end of the outer apex and the end of the turned-up portion, where strain applied to the RFID tag was small and a good communication environment was formed.

Examples 1 and 2 and Comparative Example 1 were prepared by changing the position of the tag member. In each case, the outer end of the tag member was located radially inward of the outer end of the outer apex.

In Example 1, the tag member was placed such that the entirety thereof was located between the outer end of the outer apex and the outer end of the chafer. The fact that the outer end and the inner end of the tag member are located radially outward of the outer end of the chafer is represented as "out" in the cells for outer end and inner end in Table 1.

In Example 2, the outer end of the tag member was located radially outward of the outer end of the chafer, and the inner end of the tag member was located radially inward of the outer end of the chafer. This is represented as "out" in the cell for outer end and as "in" in the cell for inner end in Table 1.

The RFID tag was placed radially outward of the outer end of the chafer.

In Comparative Example 1, the tag member was placed such that the entirety thereof was located between the outer end of the chafer and the end of the turned-up portion. The fact that the outer end and the inner end of the tag member are located radially inward of the outer end of the chafer is represented as "in" in the cells for outer end and inner end in Table 1.

State of Occurrence of Creases

A cross-section of the bead portion of a test tire was cut out to check the state of occurrence of creases. The state of occurrence of creases was evaluated on a 5-point scale with the case where no creases occurred being regarded as rank 1 and with the state of occurrence of creases of Comparative Example 1 being regarded as rank 5. The results are shown in Table 1 below. The acceptance criterion was defined as being rank 3 or lower.

TABLE 1

|  |  | Comparative Example 1 | Example 2 | Example 1 |
|---|---|---|---|---|
| Tag member | Outer end | in | out | out |
|  | Inner end | in | in | out |
| Creases |  | 5 | 3 | 1 |

As shown in Table 1, it is confirmed that occurrence of creases is suppressed in each Example. From the evaluation results, advantages of the present invention are clear.

INDUSTRIAL APPLICABILITY

The above-described technology capable of achieving formation of a good communication environment and reduction of the risk of damage to an RFID tag while suppressing occurrence of creases can be applied to various tires.

REFERENCE SIGNS LIST 2 tire
4 tread
6 sidewall
8 chafer
10 bead
12 carcass
20 steel reinforcing layer
22 interlayer strip
26 tag member
36 core
38 apex
40 inner apex
42 outer apex
46 edge strip
48 carcass ply
50 ply body
52 turned-up portion
56 tag
58 protector
60 semiconductor chip
62 antenna

The invention claimed is:

1. A heavy duty tire comprising:
a pair of beads;
a carcass extending on and between the pair of beads;
a pair of sidewalls each located axially outward of the carcass;
a pair of chafers each located radially inward of the sidewall and configured to come into contact with a rim;
a tag member including an RFID tag; and
a pair of interlayer strips,
wherein
each of the beads includes a core and an apex,
the apex includes an inner apex located radially outward of the core, and an outer apex located radially outward of the inner apex,
a complex elastic modulus at 70° C. of the inner apex is not less than 60 MPa and not greater than 90 MPa,
a complex elastic modulus at 70° C. of the chafer is not less than 10 MPa and not greater than 15 MPa,
the carcass includes a carcass ply,
the carcass ply includes a ply body extending between the pair of beads and a pair of turned-up portions each connected to the ply body and turned up around the bead,
each interlayer strip is located between the chafer and the apex in the axial direction, and covers an end of the turned-up portion,
the outer apex is more flexible than the chafer,
the interlayer strip is harder than the sidewall and is more flexible than the chafer,
the tag member is a plate-shaped member including the RFID tag and a protector covering an entirety of the RFID tag,
a thickness of the tag member is not less than 1.0 mm and not greater than 2.5 mm,
the tag member is in contact with the outer apex on a radially outer side of an end of the turned-up portion,
the RFID tag is located between an outer end of the outer apex and an outer end of the chafer in a radial direction,
an inner end of the tag member is located radially outward of the outer end of the chafer, and
an outer end of the interlayer strip is located radially inward of an inner end of the tag member.

2. The heavy duty tire according to claim 1, wherein
the outer end of the chafer is located radially outward of an inner end of the sidewall, and
the sidewall covers the outer end of the chafer.

3. The heavy duty tire according to claim 2, wherein a ratio of a radial height of the outer end of the chafer to a radial height of the inner end of the sidewall is not less than 2.00 and not greater than 3.25.

4. The heavy duty tire according to claim 1, wherein a ratio of a radial height of the outer end of the outer apex to the radial height of the outer end of the chafer is not less than 1.08 and not greater than 1.54.

5. The heavy duty tire according to claim 1, wherein the tag member is provided on a side of a first sidewall out of the pair of sidewalls.

6. The heavy duty tire according to claim 1, wherein an outer end of the inner apex is located between the end of the turned-up portion and the RFID tag in the radial direction.

7. The heavy duty tire according to claim 1, wherein the outer end of the tag member is located radially inward of the outer end of the outer apex.

8. The heavy duty tire according to claim 1, wherein the protector has stiffness substantially equal to the stiffness of the outer apex.

9. The heavy duty tire according to claim 1, wherein the outer apex has stiffness substantially equal to the stiffness of the sidewall, or is harder than the sidewall.

10. The heavy duty tire according to claim 1, wherein the chafer is harder than the sidewall.

11. The heavy duty tire according to claim 1, wherein a complex elastic modulus at 70° C. of the sidewall is not less than 2.0 MPa and not greater than 6.0 MPa.

12. The heavy duty tire according to claim 1, wherein a complex elastic modulus at 70° C. of the outer apex is not less than 3.0 MPa and not greater than 6.0 MPa.

13. The heavy duty tire according to claim 1, wherein the apex further includes an edge strip located axially outward of the outer apex,
the edge strip forms a part of an outer surface of the apex,
the edge strip is more flexible than the chafer and is harder than the outer apex, and
an outer end of the edge strip is located radially inward of an inner end of the tag member.

14. The heavy duty tire according to claim 13, wherein the protector is more flexible than the edge strip.

15. The heavy duty tire according to claim 1, wherein the protector is more flexible than the interlayer strip.

16. A heavy duty tire comprising:
a pair of beads;
a carcass extending on and between the pair of beads;
a pair of sidewalls each located axially outward of the carcass;
a pair of chafers each located radially inward of the sidewall and configured to come into contact with a rim;
a tag member including an RFID tag; and
a pair of interlayer strips, wherein
each of the beads includes a core and an apex,
the apex includes an inner apex located radially outward of the core, an outer apex located radially outward of the inner apex, and an edge strip located axially outward of the outer apex,
the edge strip forms a part of an outer surface of the apex,
a complex elastic modulus at 70° C. of the inner apex is not less than 60 MPa and not greater than 90 MPa,
a complex elastic modulus at 70° C. of the chafer is not less than 10 MPa and not greater than 15 MPa,
the carcass includes a carcass ply,
the carcass ply includes a ply body extending between the pair of beads and a pair of turned-up portions each connected to the ply body and turned up around the bead,
the tag member is in contact with the outer apex on a radially outer side of an end of the turned-up portion,
each interlayer strip is located between the chafer and the apex in the axial direction, and covers an end of the turned-up portion,
the edge strip is more flexible than the chafer and is harder than the outer apex,
the outer apex is more flexible than the chafer,
the interlayer strip is harder than the sidewall and is more flexible than the chafer,
the tag member is a plate-shaped member including the RFID tag and a protector covering an entirety of the RFID tag,
a thickness of the tag member is not less than 1.0 mm and not greater than 2.5 mm,
the RFID tag is located between an outer end of the outer apex and an outer end of the chafer in a radial direction, and
an inner end of the tag member is located radially outward of the outer end of the chafer,
an outer end of the interlayer strip is located radially inward of an inner end of the tag member,
an end of the turned-up portion is interposed between the edge strip and the interlayer strip, and
the outer end of the interlayer strip is located between an inner end of the tag member and the outer end of the edge strip in the radial direction.

17. The heavy duty tire according to claim 16, wherein the protector is more flexible than the edge strip and is more flexible than the interlayer strip.

18. A heavy duty tire comprising:
a pair of beads;
a carcass extending on and between the pair of beads;
a pair of sidewalls each located axially outward of the carcass;
a pair of chafers each located radially inward of the sidewall and configured to come into contact with a rim;
a pair of interlayer strips; and
a tag member including an RFID tag, wherein
each of the beads includes a core and an apex,
the apex includes an inner apex located radially outward of the core, an outer apex located radially outward of the inner apex, and an edge strip located axially outward of the outer apex,
the edge strip forms a part of an outer surface of the apex,
the carcass includes a carcass ply,
the carcass ply includes a ply body extending between the pair of beads and a pair of turned-up portions each connected to the ply body and turned up around the bead,
the tag member is a plate-shaped member including the RFID tag and a protector covering an entirety of the RFID tag,
each interlayer strip is located between the chafer and the apex in the axial direction, and covers an end of the turned-up portion,
the edge strip is more flexible than the chafer and is harder than the outer apex,
the interlayer strip is harder than the sidewall and is more flexible than the chafer,
the protector is more flexible than the edge strip,
the protector is more flexible than the interlayer strip,
the tag member is in contact with the outer apex on a radially outer side of an end of the turned-up portion,
the RFID tag is located between an outer end of the outer apex and an outer end of the chafer in a radial direction,
an outer end of the tag member is located radially outward of the outer end of the chafer,
an outer end of the edge strip is located radially inward of an inner end of the tag member,
an outer end of the interlayer strip is located radially inward of the inner end of the tag member,
an end of the turned-up portion is interposed between the edge strip and the interlayer strip, and
the outer end of the interlayer strip is located between the inner end of the tag member and the outer end of the edge strip in the radial direction.

* * * * *